United States Patent
Shi et al.

(10) Patent No.: US 11,721,229 B2
(45) Date of Patent: Aug. 8, 2023

(54) QUESTION CORRECTION METHOD, DEVICE, ELECTRONIC EQUIPMENT AND STORAGE MEDIUM FOR ORAL CALCULATION QUESTIONS

(71) Applicant: Hangzhou Dana Technology Inc., Zhejiang (CN)

(72) Inventors: Fan Shi, Zhejiang (CN); Tao He, Zhejiang (CN); Huan Luo, Zhejiang (CN); Mingquan Chen, Zhejiang (CN)

(73) Assignee: Hangzhou Dana Technology Inc., Zhejiang (CN)

( * ) Notice: Subject to any disclaimer, the term of this patent is extended or adjusted under 35 U.S.C. 154(b) by 643 days.

(21) Appl. No.: 16/756,468

(22) PCT Filed: Sep. 11, 2019

(86) PCT No.: PCT/CN2019/105321
§ 371 (c)(1),
(2) Date: Apr. 15, 2020

(87) PCT Pub. No.: WO2020/063347
PCT Pub. Date: Apr. 2, 2020

(65) Prior Publication Data
US 2021/0192965 A1    Jun. 24, 2021

(30) Foreign Application Priority Data

Sep. 26, 2018  (CN) .......................... 201811125657.5
Sep. 26, 2018  (CN) .......................... 201811125659.4

(51) Int. Cl.
*G06N 3/08*       (2023.01)
*G06F 16/245*    (2019.01)
(Continued)

(52) U.S. Cl.
CPC ............. *G09B 7/02* (2013.01); *G06F 16/245* (2019.01); *G06F 18/21* (2023.01); *G06F 40/284* (2020.01);
(Continued)

(58) Field of Classification Search
CPC ....... G09B 7/02; G09B 19/025; G06F 16/245; G06F 40/284; G06K 9/6217; G06N 3/04;
(Continued)

(56) References Cited

U.S. PATENT DOCUMENTS

2010/0235164 A1* 9/2010 Todhunter ............... G06F 40/35
                                                                                704/9
2015/0161903 A1* 6/2015 Colliander ........... G06Q 10/103
                                                                                434/350

FOREIGN PATENT DOCUMENTS

CN       103164994        6/2013
CN       105955962        9/2016
(Continued)

OTHER PUBLICATIONS

CN103927552A, published Jul. 16, 2014, pp. 1-16. (Year: 2014).*
(Continued)

*Primary Examiner* — Stephen S Hong
*Assistant Examiner* — Ahamed I Nazar
(74) *Attorney, Agent, or Firm* — JCIP Global Inc.

(57) ABSTRACT

The present disclosure provides a question correction method and device for oral calculation questions. The feature vector of the question to be searched is obtained according to the content of token in the stem of each question to be searched, and then the feature vector of each question to be searched is used to search for the target test paper that matches the test paper to be searched in the question bank. For the question to be searched in the form of oral calculation question, a second search is performed in (Continued)

the target test paper based on the feature vector of the question, and the search criterion is the minimum shortest editing distance. If the question type of the matched target question is also an oral calculation question, it is determined that the question to be searched is the oral calculation question to be corrected, then a preset oral calculation engine is used to calculate the oral calculation question to be corrected and the calculation result is output as the answer to the oral calculation question to be corrected. By applying the solution provided by the present disclosure, the accuracy of correction on oral calculation questions can be improved.

22 Claims, 4 Drawing Sheets

(51) Int. Cl.
*G09B 7/02* (2006.01)
*G06F 40/284* (2020.01)
*G06N 3/04* (2023.01)
*G09B 19/02* (2006.01)
*G06V 30/40* (2022.01)
*G06F 18/21* (2023.01)
*G06V 30/14* (2022.01)
*G06V 30/148* (2022.01)
*G06V 30/19* (2022.01)
*G06V 10/82* (2022.01)
*G06V 30/413* (2022.01)

(52) U.S. Cl.
CPC .............. *G06N 3/04* (2013.01); *G06N 3/08* (2013.01); *G06V 10/82* (2022.01); *G06V 30/1444* (2022.01); *G06V 30/153* (2022.01); *G06V 30/19173* (2022.01); *G06V 30/40* (2022.01); *G06V 30/413* (2022.01); *G09B 19/025* (2013.01)

(58) Field of Classification Search
CPC ........ G06N 3/08; G06N 3/0454; G06V 10/40; G06V 30/40; G06V 30/10; G06V 10/82; G06V 30/1444; G06V 30/153; G06V 30/19173; G06V 30/413

USPC .......................................... 382/229; 434/167
See application file for complete search history.

(56) References Cited

FOREIGN PATENT DOCUMENTS

| | | |
|---|---|---|
| CN | 106096564 | 11/2016 |
| CN | 107832758 | 3/2018 |
| CN | 108052504 | 5/2018 |
| CN | 109189895 | 1/2019 |
| CN | 109284355 | 1/2019 |
| JP | 2013097722 | 5/2013 |

OTHER PUBLICATIONS

CN105096678A, published Nov. 25, 2015, pp. 1-14. (Year: 2015).*
CN108053348B, published May 18, 2018, pp. 1-13. (Year: 2018).*
CN104657923B, published May 27, 2018, pp. 1-13. (Year: 2018).*
CN103065626B, published Apr. 24, 2013, pp. 1-14. (Year: 2013).*
CN105373594A, published Mar. 2, 2016, pp. 1-14. (Year: 2016).*
Liang et al. (Character-level convolutional networks for arithmetic operator character recognition, published 2016, pp. 1-5) (Year: 2016).*
"International Search Report (Form PCT/ISA/210) of PCT/CN2019/105321," dated Nov. 27, 2019, pp. 1-5.
Zhije Liang et al., "Charater-level convolutional networks for arithmetic operator character recognition", 2016 International Conference on Educational Innovation Through Technology (EITT), IEEE, Sep. 22, 2016, pp. 208-212.
Theodore Bluche, "Mathematical Formula Recognition using Machine Learning Techniques", Sep. 3, 2010, pp. 1-143. Available at: https://www.reasearchgate.net/profile/Mohamed_Mourad_Lafifi/post/How-can-I-use-fuzzy-logic-for-character-recognition-Can-you-suggest-some-mathematics-equations/attachment/5c1cee4dcfe4a764550a907e/AS: 706272462647296@1545399885139/download/Mathematical%20Formula%20Recognition%20using%20Mahine%20Learni.
"Search Report of Europe Counterpart Application", dated May 19, 2022, p. 1-p. 12.

* cited by examiner

QUESTION CORRECTION METHOD, DEVICE, ELECTRONIC EQUIPMENT AND STORAGE MEDIUM FOR ORAL CALCULATION QUESTIONS

CROSS-REFERENCE TO RELATED APPLICATION

This application is a 371 of international application of PCT application Ser. No. PCT/CN2019/105321, filed on Sep. 11, 2019, which claims the priority benefit of China application no. 201811125657.5 and 201811125659.4, filed on Sep. 26, 2018. The entirety of each of the above mentioned patent applications is hereby incorporated by reference herein and made a part of this specification.

BACKGROUND

Technical Field

The present disclosure relates to the field of artificial intelligence technology, and in particular, to a question correction method, device, electronic equipment, and computer-readable storage medium for oral calculation questions.

Description of Related Art

With the continuous advancement of computer technology and informatization of education, computer technology has gradually been applied to various activities in daily education and teaching, such as the corresponding application in the teaching evaluation scenario. In China, the main form of assessment on basic education and students' progress is still various types of examinations or tests. Under this circumstances, teachers are under great pressure to mark test papers.

At present, smart terminal products involve a number of search APPs for marking assignments and test papers. By inputting the images containing test papers to be reviewed into the search APP, the search APP can search the questions corresponding to various questions in the images of test paper from the question bank according to the image content of the test paper.

Existing question search methods can generate a feature vector of a question based on the token content in the stem of the question, and search of questions from the question bank can be made based on the feature vector. When generating feature vectors, different tokens have different weights based on word frequency. The more frequently appeared token in the stem is regarded to be less important (for example, the word "of" in the stem appears frequently in the stem and thus being regarded less important), and the lower the weight of the token is set.

However, for oral calculation questions, the content of token in the stem of oral calculation question is mostly numbers and calculation symbols, and the frequency of numbers and calculation symbols is relatively high, that is, there is a lack of token with discriminating degree of high weight among the token in the stem of oral calculation questions, which causes that the feature vectors corresponding to different oral calculation questions to be less distinguished from one another. Once a slight identification error occurs in the identification engine, an oral calculation question will be matched to a different oral calculation question, which leads to errors in marking oral calculation questions.

It can be seen that errors are likely to occur in marking oral calculation questions and the accuracy is not high.

SUMMARY

The purpose of the present disclosure is to provide a question correction method, device, electronic equipment, and computer-readable storage medium for oral calculation questions, so as to solve the existing problem of high error rate and low accuracy in marking oral calculation questions.

In order to solve the above technical problem, the present disclosure provides a question correction method for oral calculation questions. The method includes:

Step S11: detecting the image of the test paper to be searched, detecting the areas of each question to be searched on the test paper to be searched, determining the type of each question to be searched, and identifying the content of token in the stem in the area of each question to be searched;

Step S12: obtaining the feature vector of the question to be searched according to the token content in the stem of each question to be searched, and conducting search in the question bank according to the feature vector of the question to be searched to find the question most similar to the question to be searched;

Step S13: summarizing all the test papers with the questions most similar to the questions to be searched, and comparing the summarized test papers with preset condition. If a target test paper satisfying the preset condition is found, the test paper satisfying the preset condition is determined to be the target test paper matching the test paper to be searched;

Step S14: in the case that the test paper to be searched includes a question to be searched in the form of oral calculation questions, for each question to be searched in the form of oral calculation question, the feature vector of the question to be searched and the feature vector of each question in the target test paper are subjected to shortest editing distance matching to determine the target question that matches the question to be searched in the target test paper, if the type of question of the target question is an oral calculation question, the question to be searched is determined as the oral calculation question to be corrected; and Step S15: for each oral calculation question to be corrected, a preset oral calculation engine is used to calculate the oral calculation question to be corrected, and the calculation result of the oral calculation engine is output as the answer to the oral calculation question to be corrected, thereby completing correction of oral calculation questions to be corrected on the test paper.

Optionally, in step S14, the question type of the target question is oral calculation question, and in the circumstances the position of the target question in the target test paper is the same as that of the question to be searched in the test paper to be searched, it is determined that the question to be searched is the oral calculation question to be corrected.

Optionally, in step S13, if there is no target test paper that satisfies a preset condition, and when the test paper to be searched contains a question to be searched in the form of an oral calculation question, the question to be searched in the form of oral calculation question is determined as the oral calculation question to be corrected, and step S15 is performed.

Optionally, step S15 further includes: checking whether the calculation result of the oral calculation engine is consistent with the reference answer corresponding to the oral calculation question to be corrected on the target test paper, and if they are consistent, the calculation result of the oral calculation engine is used as the answer to the oral calculation question to be corrected.

Optionally, when the calculation result of the oral calculation engine is inconsistent with the reference answer to the oral calculation question to be corrected on the target test paper, a prompt message indicating that the calculation result of the oral calculation engine is inconsistent with the reference answer to the oral calculation question to be corrected is output.

Optionally, the preset oral calculation engine includes a pre-trained first identification model, and the first identification model is a neural network-based model.

In step S15, the preset oral calculation engine is used to calculate the oral calculation question to be corrected, which includes:

The pre-trained first identification model is used to identify numbers, alphabets, text, characters, and calculation types in the oral calculation question to be corrected. The calculation types include one of four mixed arithmetic calculation, estimation, division with remainder, fraction calculation, conversion of units, vertical calculation, and recursion equation calculation; and perform calculation according to the identified numbers, alphabets, text, characters, and calculation types to obtain the calculation result of the oral calculation question to be corrected.

Optionally, the step S12 includes:

Step S121, the token content in the stem of each question to be searched is input into a pre-trained stem vectorization model to obtain the feature vector of the stem of each question to be searched as the feature vector of each question to be searched, wherein the stem vectorization model is a neural network-based model; and Step S122: for each question to be searched, a search is performed in the question bank to find a feature vector matching the feature vector of the question to be searched, and the corresponding question with the matching feature vector in the question bank is determined to be the question most similar to the question to be searched.

Optionally, the stem vectorization model is obtained through training in the following steps:

marking each question sample in a question sample training set to mark the token content of the stem in each question sample; and using a neural network model to extract two-dimensional feature vectors of the token content of the stem in each question sample, thereby obtaining the stem vectorization model through training.

Optionally, before performing step S12, the question correction method for oral calculation question further includes: establishing an index information table for feature vectors of each question on the test paper in the question bank.

Step S122 includes:

for each question to be searched, look up the index information table for a feature vector matching the feature vector of the question to be searched; and determine the question corresponding to the matching feature vector in the index information table as the question most similar to the question to be searched.

Optionally, before establishing the index information table, the question correction method for oral calculation questions further includes: grouping feature vectors of different lengths according to lengths.

For each question to be searched, look up the index information table for the feature vector matching the feature vector of the question to be searched, which includes:

for each question to be searched, in the index information table, find a feature vector matching the feature vector of the question to be searched in a group having the same or similar length as the feature vector of the question to be searched.

Optionally, in step S13, determining a test paper that satisfies a preset condition as a target test paper that matches the test paper to be searched includes:

determine the test paper with the highest frequency of occurrence greater than the first preset threshold as the target test paper that matches the test paper to be searched.

Optionally, in step S11, the image of the test paper to be searched is detected to detect the area of each question to be searched on the test paper to be searched, which includes:

The image of the test paper to be searched is detected by using a pre-trained detection model to detect the area of each question to be searched on the test paper to be searched, wherein the detection model is a neural network-based model.

Optionally, in step S11, identifying the token content in the stem in the area of each question to be searched includes:

The pre-trained second identification model is used to identify the token content in the stem in the area of each question to be searched, wherein the second identification model is a neural network-based model.

Optionally, after step S11 is performed, and before step S12 is performed, the question correction method for oral calculation questions further includes:

using a preset oral calculation engine to perform calculation processing on the area containing the calculation formula and/or formula in the test paper to be searched to obtain the calculation result of each area;

specifically, in step S15, for each oral calculation question to be corrected, the calculation result of the oral calculation engine corresponding to the area of the oral calculation question to be corrected is used as the answer to the oral calculation question to be corrected, thereby completing the correction of the question to be corrected on the test paper to be corrected.

In order to achieve the above purpose, the present disclosure also provides a question correcting device for oral calculation questions. The device includes:

a detection and identification module, configured to detect images of the test papers to be searched to detect the areas of each question to be searched on the test papers to be searched, thereby determining the type of each question to be searched, and identify the token content in the stem of the area of each question to be searched;

a question searching module, configured to obtain the feature vector of the question to be searched according to the token content of the stem of each question to be searched, and perform a search in the question bank according to the feature vector of the question to be searched to find the question most similar to the question to be searched;

a test paper determining module, configured to summarize all the test papers with the questions most similar to the question to be searched, and compare the summarized test papers with the preset condition; if a target test paper that satisfies the preset condition is found, the test paper that satisfies the preset condition is determined as the target test paper that matches the test paper to be searched;

an oral calculation question determining module configured to, in a case where the test paper to be searched includes a question to be searched in the form of an oral calculation question, for each question to be searched in the form of oral calculation question, the feature vector of the question to be searched and the feature vector of each question in the target test paper are subjected to shortest editing distance matching to determine the target question that matches the question to be searched in the target test paper, if the type of question of the target question is an oral calculation question, the question to be searched is determined as the oral calculation question to be corrected;

an oral calculation question correcting module, configured to calculate the oral calculation question to be corrected by using a preset oral calculation engine with respect to each oral calculation question to be corrected, and output the calculation result of the oral calculation engine as the answer to the oral calculation question to be corrected, thereby completing correction of the oral calculation question to be corrected on the test paper to be searched.

Optionally, the oral calculation question determining module is further configured to, in the circumstances the position of the target question in the target test paper is the same as that of the question to be searched in the test paper to be searched, determine that the question to be searched is the oral calculation question to be corrected.

Optionally, the test paper determining module is further configured to, if there is no target test paper that satisfies a preset condition, and when the test paper to be searched contains a question to be searched in the form of an oral calculation question, determine the question to be searched in the form of oral calculation question as the oral calculation question to be corrected.

Optionally, the oral calculation question correcting module is further configured to check whether the calculation result of the oral calculation engine is consistent with the reference answer corresponding to the oral calculation question to be corrected on the target test paper, and if they are consistent, the calculation result of the oral calculation engine is output as the answer to the oral calculation question to be corrected.

Optionally, the oral calculation question correcting module is further configured to, when the calculation result of the oral calculation engine is inconsistent with the reference answer to the oral calculation question to be corrected on the target test paper, output a prompt message indicating that the calculation result of the oral calculation engine is inconsistent with the reference answer to the oral calculation question to be corrected.

Optionally, the preset oral calculation engine includes a pre-trained first identification model, and the first identification model is a neural network-based model.

The oral calculation question correcting module is configured to identify numbers, alphabets, text, characters, and calculation types in the oral calculation question to be corrected through the pre-trained first identification model, and the calculation types include one of four mixed arithmetic calculation, estimation, division with remainder, fraction calculation, conversion of units, vertical calculation, and recursion equation calculation. Calculations are performed based on the identified numbers, alphabets, text, characters, and calculation types to obtain the calculation result of the oral calculation question to be corrected.

Optionally, the question searching module includes:

a feature vector obtaining unit, configured to input the token content in the stem of each question to be searched into a pre-trained stem vectorization model to obtain the feature vector of the stem of each question to be searched as the feature vector of each question to be searched, wherein the stem vectorization model is a neural network-based model;

a question searching unit, configured to perform a search for each question to be searched in the question bank to find a feature vector matching the feature vector of the question to be searched, and determine the corresponding question with the matching feature vector in the question bank to be the question most similar to the question to be searched.

Optionally, the stem vectorization model is obtained through training in the following steps:

marking each question sample in a question sample training set to mark the token content of the stem in each question sample;

using a neural network model to extract two-dimensional feature vectors of the token content of the stem in each question sample, thereby obtaining the stem vectorization model through training.

Optionally, the device further includes:

a preprocessing module, configured to establish an index information table for feature vectors of each question on the test paper in the question bank;

the question searching unit, specifically configured to, for each question to be searched, look up the index information table for a feature vector matching the feature vector of the question to be searched; and determine the question corresponding to the matching feature vector in the index information table as the question most similar to the question to be searched.

Optionally, before establishing the index information table, the preprocessing module is further configured to group feature vectors of different lengths according to lengths.

The question searching unit is specifically configured to, for each question to be searched, look up the index information table to find a feature vector matching the feature vector of the question to be searched in a group having the same or similar length as the feature vector of the question to be searched.

Optionally, the test paper determining module is specifically configured to determine the test paper with the highest frequency of occurrence greater than the first preset threshold as the target test paper that matches the test paper to be searched.

Optionally, the detection and identification module is specifically configured to use a pre-trained detection model to detect the image of the test paper to be searched to detect the area of each question to be searched on the test paper to be searched, wherein the detection model is a neural network-based model.

Optionally, the detection and identification module is specifically configured to use the pre-trained second identification model to identify the token content in the stem in the area of each question to be searched, wherein the second identification model is a neural network-based model.

Optionally, the question correcting device for oral calculation questions further includes:

a calculation module, configured to use a preset oral calculation engine to perform calculation processing on the area containing the calculation formula and/or formula in the test paper to be searched to obtain the calculation result of each area;

wherein the oral calculation question correcting module is configured to, for each oral calculation question to be corrected, use the calculation result of the oral calculation engine corresponding to the area of the oral calculation question to be corrected as the answer to the oral calculation question to be corrected, thereby completing the correction of the oral calculation question to be corrected on the test paper to be searched.

To achieve the above purpose, the present disclosure also provides an electronic device including a processor, a communication interface, a memory, and a communication bus, wherein the processor, the communication interface, and the memory complete communication with each other through the communication bus.

The memory is configured for storing computer programs.

The processor is configured to implement the steps of the question correction method for oral calculation questions as described above when the program stored in the memory is executed.

To achieve the above purpose, the present disclosure also provides a computer-readable storage medium, characterized in that a computer program is stored in the computer-readable storage medium, and the computer program implements the steps of the question correction method for oral calculation questions as described above when being executed by the processor.

In order to achieve the above purpose, the present disclosure also provides a question correction method for oral calculation questions, the method includes:

Step S41: detecting the image of the test paper to be searched, detecting the areas of each question to be searched on the test paper to be searched, determining the type of each question to be searched, and identifying the content of token in the stem in the area of each question to be searched;

Step S42: using a preset oral calculation engine to perform calculation processing on the area containing the calculation formula and/or formula in the test paper to be searched to obtain the calculation result of each area;

Step S43: obtaining the feature vector of the question to be searched according to the token content in the stem of each question to be searched, and conducting search in the question bank according to the feature vector of the question to be searched to find the question most similar to the question to be searched;

Step S44: summarizing all the test papers with the questions most similar to the questions to be searched, and comparing the summarized test papers with preset condition, if a target test paper satisfying the preset condition is found, the test paper satisfying the preset condition is determined to be the target test paper matching the test paper to be searched;

Step S45: in the case that the question paper to be searched includes a question to be searched in the form of oral calculation question, for each question to be searched in the form of oral calculation question, the feature vector of the question to be searched and the feature vector of each question in the target test paper are subjected to shortest editing distance matching to determine the target question that matches the question to be searched in the target test paper, if the type of question of the target question is an oral calculation question, the question to be searched is determined as the oral calculation question to be corrected; and Step S46: for each oral calculation question to be corrected, the calculation result of the oral calculation engine corresponding to the area of the oral calculation question to be corrected is used as the answer to the oral calculation question to be corrected, thereby completing the correction of the oral calculation question to be corrected on the test paper to be searched.

In order to achieve the above purpose, the present disclosure also provides a question correcting device for oral calculation questions. The device includes:

a detection and identification module, configured to detect images of the test papers to be searched to detect the areas of each question to be searched on the test papers to be searched, thereby determining the type of each question to be searched, and identify the token content in the stem of the area of each question to be searched;

a calculation module, configured to use a preset oral calculation engine to perform calculation processing on the area containing the calculation formula and/or formula in the test paper to be searched to obtain the calculation result of each area;

a question searching module, configured to obtain the feature vector of the question to be searched according to the token content of the stem of each question to be searched, and perform a search in the question bank according to the feature vector of the question to be searched to find the question most similar to the question to be searched;

a test paper determining module, configured to summarize all the test papers with the questions most similar to the question to be searched, and compare the summarized test papers with the preset condition; if a target test paper that satisfies the preset condition is found, the test paper that satisfies the preset condition is determined as the target test paper that matches the test paper to be searched;

an oral calculation question determining module configured to, in a case where the test paper to be searched includes a question to be searched in the form of oral calculation question, for each question to be searched in the form of oral calculation question, the feature vector of the question to be searched and the feature vector of each question in the target test paper are subjected to shortest editing distance matching to determine the target question that matches the question to be searched in the target test paper, if the type of question of the target question is an oral calculation question, the question to be searched is determined as the oral calculation question to be corrected; an oral calculation question correcting module, configured to, for each oral calculation question to be corrected, use the calculation result of the oral calculation engine corresponding to the area of the oral calculation question to be corrected as the answer to the oral calculation question to be corrected, thereby completing the correction of the question to be corrected on the test paper to be searched.

Compared with the related art, with respect to the test paper to be searched, the present disclosure first obtains the feature vector of the question to be searched according to the token content in the stem of each question to be searched, and then use the feature vector of each question to be searched to find the target test paper matching the test paper to be searched in the question bank. With respect to the oral calculation question to be searched, the present disclosure performs two times of search on the target test papers based on the feature vector of the question, and the search criterion is the minimum shortest editing distance. If the question type of the matched target question is also an oral calculation question, it is determined that the question to be searched is the oral calculation question to be corrected, then the preset oral calculation engine is used to calculate the oral calculation question to be corrected and the calculation result is output as the answer to the oral calculation question to be corrected. Based on the above, it can be seen that, for the oral calculation question to be corrected, since the feature vectors obtained based on the token content of stem are less distinguished from one another, leading to the result that the reference answers for the target test paper found in the question bank are more likely to be inconsistent with the oral calculation questions to be corrected. Accordingly, two times of search are preformed to determine the oral calculation question to be corrected and the oral calculation engine is used to perform calculation, thereby improving the accuracy of correcting the oral calculation questions.

DESCRIPTION OF THE EMBODIMENTS

In the following, a question correction method, device, electronic equipment, and computer-readable storage medium for oral calculation questions provided by the present disclosure are further described in detail with reference to the drawings and specific embodiments. The advantages and features of the disclosure will be elaborated in claims and the following descriptions.

In order to solve the problems in the related art, embodiments of the present disclosure provide a question correction method, device, electronic equipment, and computer-readable storage medium for oral calculation questions.

It should be noted that the question correction method for oral calculation questions in the embodiment of the present disclosure can be applied to the question correcting device for oral calculation questions in the embodiment of the present disclosure. The question correcting device for oral calculation questions can be configured on an electronic equipment. Specifically, the electronic equipment may be a personal computer, a mobile terminal, etc., and the mobile terminal may be a hardware device such as a mobile phone or a tablet computer with various operating systems.

Example 1

Figure 1:
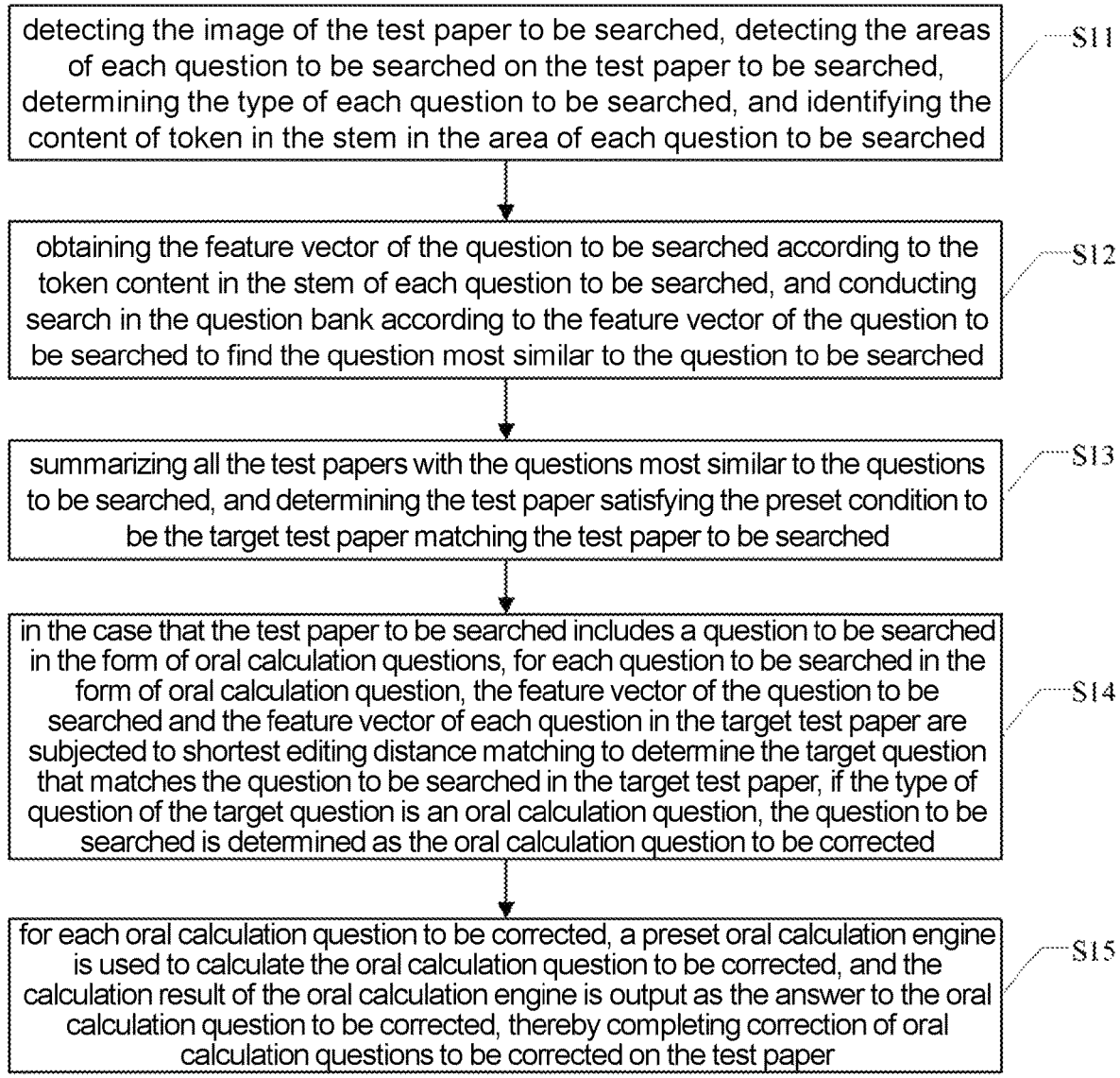
FIG. 1 is a schematic flow chart of a question correction method for oral calculation questions provided by an embodiment of the present disclosure.

FIG. 1 is a schematic flow chart of a question correction method for oral calculation questions provided by an embodiment of the present disclosure. Please refer to FIG. 1, a question correction method for oral calculation questions may include the following steps:

Step S11: detecting the image of the test paper to be searched, detecting the areas of each question to be searched on the test paper to be searched, determining the type of each question to be searched, and identifying the content of token in the stem in the area of each question to be searched.

The image of the test paper to be searched can be an image containing the test paper to be searched. Specifically, the image of the test paper to be searched can be detected by using a detection model to detect the area of each question to be searched on the test paper to be searched. The detection model is a neural network-based model. Specifically, the detection model may be obtained, for example, by training samples in a test paper sample training set based on a Deep Convolutional Neural Network (CNN). The trained detection model is used to extract two-dimensional feature vectors from the images of the test papers to be searched, and anchor points with different shapes are generated on each grid of the two-dimensional feature vectors. A groundtruth box is used to mark the detected area of each question to be searched, and the groundtruth box and the generated anchor point are further subjected to a regression process so that the groundtruth box is closer to the actual position of the question. After the area of question is identified, each question to be searched is cut into a single image, or not actually cut but is subjected to processing by separating each area of question to be searched as a single area image for processing and arranged in order according to the information of question position.

After identifying the area of each question to be searched, a classification identification model can be used to determine the type of each question to be searched. The classification identification model is a neural network-based model. Specifically, the classification identification model may be obtained, for example, by training samples in a test paper sample training set based on a deep convolutional neural network. The questions in each sample are marked with questions types. Question types can be divided into operation questions, oral calculation questions, fill in the blank questions, multiple choice questions, application questions, etc.

Meanwhile, the content of token in the stem in the area of the question to be searched can also be identified by using a second identification model, which is a neural network-based model. First the components of the question to be searched are marked, and the components can include a stem, an answer, and/or a picture, and then the content of token in the stem in the question is identified through the second identification model, wherein the second identification model may be established based on a hole convolution and an attention model. Specifically, the hole convolution is used to extract the features of the groundtruth box corresponding to the stem, answer and/or picture, and then the attention model is used to decode the extracted feature into characters.

Step S12: obtaining the feature vector of the question to be searched according to the token content in the stem of each question to be searched, and conducting search in the question bank according to the feature vector of the question to be searched to find the question most similar to the question to be searched.

Specifically, the step S12 may further include:

Step S121, the token content in the stem of each question to be searched is input into a pre-trained stem vectorization model to obtain the feature vector of the stem of each question to be searched as the feature vector of each question to be searched, wherein the stem vectorization model is a neural network-based model.

For example, assume that the content of the token in the stem of the question to be searched is "4. Xiaoming walks for 3 minutes and is just halfway of the whole journey. How many meters is his home away from his school? (6 points)" The token content is input into a sent2vec model, which is a pre-trained stem vectorization model to obtain the feature vector of the stem, and the feature vector can be expressed as [x0, x1, x2 . . . , xn].

Specifically, the stem vectorization model may be a neural network-based model, such as a CNN model, and the stem vectorization model may be obtained by training in the following steps: marking each question sample in a question sample training set to mark the token content of the stem in each question sample; and using a neural network model to extract two-dimensional feature vectors of the token content of the stem in each question sample, thereby obtaining the stem vectorization model through training. The specific training process belongs to the related art and is not described in detail here.

Step S122: for each question to be searched, a search is performed in the question bank to find a feature vector matching the feature vector of the question to be searched, and the corresponding question with the matching feature vector in the question bank is determined to be the question most similar to the question to be searched.

Specifically, the vector approximate search approach can be used to find the feature vector matching the feature vector of the question to be searched in the question bank, and specifically to find the feature vector closest to the feature vector of the question to be searched in the question bank. It can be understood that the similarity measurement between different vectors is typically measured by calculating the "Distance" between vectors. The commonly used distance calculation methods are: European distance, Manhattan distance, angle cosine, and so on. The calculation method adopted in the Example 1 is angle cosine.

Preferably, in order to facilitate the search of feature vectors, an index information table may also be established in advance for the feature vectors of each question on the test paper in the question bank. The index information table can store the feature vector of each question in the question bank, the specific content of the question, and the ID of the test paper with the question, etc.

Correspondingly, step S122 may further include: for each question to be searched, look up the index information table for a feature vector matching the feature vector of the question to be searched; and determine the question corresponding to the matching feature vector in the index information table as the question most similar to the question to be searched.

It can be understood that after finding the matching feature vector in the index information table, the most similar question is found in the index information table, and the specific content (including the stem, answer and/or picture of the question) of the most similar question and the ID information of the test paper having the most similar question can be obtained under the circumstances.

Preferably, before establishing the index information table, the feature vectors of different lengths can be further grouped according to lengths. In this manner, when searching for a feature vector matching the feature vector of the question to be searched in the index information table, it is possible to first position the group of feature vector having the same or similar length as the feature vector of the question to be searched in the index information table (here, the group of similar length refers to that the length difference between the length of the feature vector of the question to be searched and the length of the feature vector in the index information table is less than a specific value or a preset value), so as to find the feature vector that matches the feature vector of the question to be searched in the index information table and the group having the same or similar length as the feature vector of the question to be searched. Specifically, the feature vectors having the same length can be divided into a group when grouping, and the feature vectors having a length within a certain range can also be divided into a group, which is not limited in the present disclosure. It can be seen that the feature vectors of different lengths are grouped according to length, which makes it possible to make a search in the corresponding group according to the length of feature vector when searching for questions subsequently, thereby improving the speed of question search. It can be understood that the length of the feature vector varies because of the difference in the number of token in the stem.

Step S13: summarizing all the found test papers with the questions most similar to the questions to be searched, and determining the test paper satisfying the preset condition to be the target test paper matching the test paper to be searched. Specifically, by comparing the summarized test papers with a preset condition, it is possible to obtain the information regarding whether there is any target test paper satisfying the preset condition, and when a target test paper satisfying the preset condition is found, the corresponding test paper satisfying the preset condition can be obtained.

Specifically, determining a test paper that satisfies a preset condition as a target test paper matching the test paper to be searched may specifically be that: determining a test paper with a maximum occurrence frequency greater than a first preset threshold as a target test paper matching the test paper to be searched. In practice, because each question in the question bank has the corresponding test paper ID information and position information in the current test paper, it can be determined that the most similar question belongs to which test paper according to the ID of the test paper with the most similar question, thereby determining the ID of the test paper with the maximum occurrence frequency greater than the first preset threshold, and thus determining the ID of the test paper as the matching target test paper. Specifically, the frequency of occurrence of a test paper can be calculated in the following method: the ratio of the number of most similar questions for the question to be searched in the test paper to the total number of the questions to be searched in the test paper to be searched, or the ratio of the number of the matching questions in the test paper and the test paper to be searched to the total number of the question to be searched in the test paper to be searched. It can be understood that if the occurrence frequency of the most frequently occurring test paper is less than the first preset threshold, it indicates that there are too few matching questions between the most frequently occurring test paper and the test paper to be searched. Under the circumstances, it can be regarded that there is no target test paper matching the test paper to be searched in the question bank.

Further, in the case that there is no target test paper that satisfies a preset condition in step S13, when the test paper to be searched includes a question to be searched in the form of oral calculation question, the question to be searched in the form of oral calculation question can be determined as the oral calculation question to be corrected. For each oral calculation question to be corrected, a preset oral calculation engine is used to calculate the oral calculation question to be corrected, and the calculation result of the oral calculation question to be corrected is output as the answer to the oral calculation question to be corrected, thereby completing correction of oral calculation questions to be corrected on the test paper.

Step S14: in the case that the test paper to be searched includes a question to be searched in the form of oral calculation question, for each question to be searched in the form of oral calculation question, the feature vector of the question to be searched and the feature vector of each question in the target test paper are subjected to shortest editing distance matching to determine the target question that matches the question to be searched in the target test paper, if the type of question of the target question is an oral calculation question, the question to be searched is determined as the oral calculation question to be corrected.

Specifically, for the question to be searched in the form of oral calculation question, the shortest editing distance matching process can be referred to as a second search process. Through the second search process, it is possible to further ensure the oral calculation question in the test paper to be searched. In the second search process, for each question to be searched in the form of oral calculation question, the question having the smallest shortest editing distance less than the second preset threshold as compared to the question to be searched in the target test paper is used as the search result of the question to be searched, i.e., the target question matching the question to be searched in the target test paper. If the target question is also in the form of an oral calculation question, it can be confirmed that the question to be searched is indeed an oral calculation question, so as to determine that the question to be searched is an oral calculation question to be corrected. The algorithm for performing shortest editing distance matching on feature vectors is a conventional calculation method in the related art, and is not described in detail here.

For example, assume that an oral calculation question A is "385×8−265=0" and an oral calculation question B is "375×8−265=0". These two questions are very similar in their feature vectors obtained through stem vectorization. Therefore, if a question in the test paper to be searched is "385×8−265=0", in step S12, it is very likely to determine the oral calculation question B in the question bank as the question most similar to the question, that is, the search result for the question is not accurate. In order to improve the accuracy, a second search is performed for the question in the target test paper, and the search criterion is set to be the token with the smallest shortest editing distance. Since the shortest editing distance is not calculated in weight, it is likely to find that the target question corresponding to the question in the target test paper is the oral calculation question A. Since the question type of the oral calculation question A is marked as the oral calculation question, it can be determined that the question is indeed an oral calculation question.

Further, in step S14, the question type of the target question may be an oral calculation question, and in the case where the position of the target question in the target test paper is the same as the position of the question to be searched in the test paper to be searched, it can be determined that the question to be searched is an oral calculation question to be corrected. It can be understood that the position of the question to be searched and the position of the target question are verified, that is, the position of the question identified as a question to be searched in the form of oral calculation question in the test paper to be searched is compared with the position of the target question in the target test paper. If their positions are the same, it means that the target question is indeed the correct search result for the question to be searched, which can avoid that the question to be searched is erroneously identified as another similar question in the target test paper due to the difference in vector during identification. For example, if the area where the oral calculation question to be corrected is located in the test paper to be searched is consistent with the area where the target question is located in the target test paper, it means that they have the same position.

Step S15: for each oral calculation question to be corrected, a preset oral calculation engine is used to calculate the oral calculation question to be corrected, and the calculation result of the oral calculation engine is output as the answer to the oral calculation question to be corrected, thereby completing correction of oral calculation questions to be corrected on the test paper to be searched.

Specifically, the preset oral calculation engine may include a pre-trained first identification model, the first identification model is a neural network-based model. The same as the second identification model, the first identification model may be established based on a hole convolution and an attention model. Specifically, the hole convolution is used for feature extraction on the oral calculation question to be corrected, and then the attention model is used to decode the extracted feature into characters.

In step S15, the preset oral calculation engine is used to calculate the oral calculation question to be corrected, which may include: first, the pre-trained first identification model is used to identify numbers, alphabets, text, characters, and calculation types in the oral calculation question to be corrected. The calculation types may include four mixed arithmetic calculation, estimation, division with remainder, fraction calculation, conversion of units, vertical calculation, and recursion equation calculation; and then calculation is performed according to the identified numbers, alphabets, text, characters, and calculation types to obtain the calculation result of the oral calculation question to be corrected. For example, assume that the oral calculation question to be corrected is "385×8−265=( )". The oral calculation engine can identify "3", "8", "5", "×", "8", "−", "2", "6", "5", "=", "(", " ", ")" through the first identification model. The calculation type is four mixed arithmetic calculation, and then the calculation result is obtained through automatic calculation.

Further, in order to ensure that the correction result of the oral calculation question is accurate, step S15 may further include: checking whether the calculation result of the oral calculation engine is consistent with the reference answer corresponding to the oral calculation question to be corrected on the target test paper, and if they are consistent, the calculation result of the oral calculation engine is output and used as the answer to the oral calculation question to be corrected.

Further, when the calculation result of the oral calculation engine is inconsistent with the reference answer to the oral calculation question to be corrected on the target test paper, a prompt message indicating that the calculation result of the oral calculation engine is inconsistent with the reference answer to the oral calculation question to be corrected is output, so as to alert the examiner of the test paper to pay attention to the oral calculation question to be corrected.

For example, if the calculation result of the oral calculation engine is consistent with the reference answer corresponding to the oral calculation question to be corrected on the target test paper, the calculation result of the oral calculation engine is displayed in the area of the oral calculation question to be corrected. If they are inconsistent, a prompt message is displayed in the area of the oral calculation question to be corrected, and the prompt message can be: "Answer to be verified, please correct manually".

In summary, compared with the related art, with respect to the test paper to be searched, the present disclosure first obtains the feature vector of the question to be searched according to the token content in the stem of each question to be searched, and then use the feature vector of each question to be searched to find the target test paper matching the test paper to be searched in the question bank. With respect to the question to be searched in the form of oral calculation question, the present disclosure performs two times of search on the target test papers based on the feature vector of the question, and the search criterion is the minimum shortest editing distance. If the question type of the matched target question is also an oral calculation question, it is determined that the question to be searched in the form of oral calculation question is the oral calculation question to be corrected, then the preset oral calculation engine is used to calculate the oral calculation question to be corrected and the calculation result is output as the answer to the oral calculation question to be corrected. Based on the above, it can be seen that, for the oral calculation question to be corrected, since the feature vectors obtained based on the token content of stem are less distinguished from one another, leading to the result that the reference answers for the target test paper found in the question bank are more likely to be inconsistent with the oral calculation questions to be corrected. Accordingly, two times of search are preformed to determine the oral calculation question to be corrected and the oral calculation engine is used to perform calculation, thereby improving the accuracy of correcting the oral calculation questions.

Figure 2:
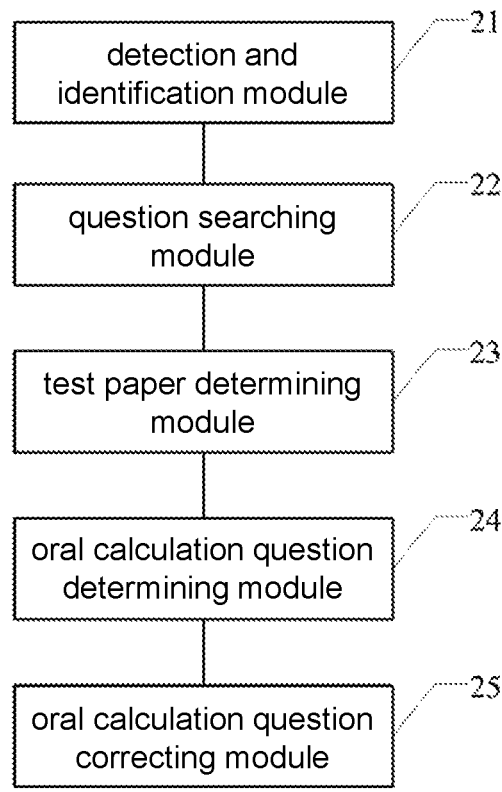
FIG. 2 is a schematic structural diagram of a question correcting device for correcting oral calculation questions provided by an embodiment of the present disclosure.

Corresponding to the above-mentioned embodiment of the question correction method for oral calculation questions, the present disclosure provides a question correcting device for oral calculation questions. Referring to FIG. 2, the device may include:

a detection and identification module 21, which may be configured to detect images of the test papers to be searched to detect the areas of each question to be searched on the test papers to be searched, thereby determining the type of each question to be searched, and identify the token content in the stem of the area of each question to be searched;

a question searching module 22, which may be configured to obtain the feature vector of the question to be searched according to the token content of the stem of each question to be searched, and perform a search in the question bank according to the feature vector of the question to be searched to find the question most similar to the question to be searched;

a test paper determining module 23, which may be configured to summarize all the test papers with the questions most similar to the question to be searched, and determine the test paper that satisfies the preset condition as the target test paper that matches the test paper to be searched;

an oral calculation question determining module 24 which may be configured to, in a case where the test paper to be searched includes a question to be searched in the form of an oral calculation question, for each question to be searched in the form of oral calculation question, the feature vector of the question to be searched and the feature vector of each question in the target test paper are subjected to shortest editing distance matching to determine the target question that matches the question to be searched in the target test paper, if the type of question of the target question is an oral calculation question, the question to be searched is determined as the oral calculation question to be corrected;

an oral calculation question correcting module 25, which may be configured to calculate the oral calculation question to be corrected by using a preset oral calculation engine with respect to each oral calculation question to be corrected, and output the calculation result of the oral calculation engine as the answer to the oral calculation question to be corrected, thereby completing correction of the oral calculation question to be corrected on the test paper to be searched.

Optionally, the oral calculation question determining module 24 is further configured to, in the circumstances that the target question is in the form of an oral calculation question and the position of the target question in the target test paper is the same as that of the question to be searched in the test paper to be searched, determine that the question to be searched is the oral calculation question to be corrected.

Optionally, the test paper determining module 23 is further configured to, if there is no target test paper that satisfies a preset condition, and when the test paper to be searched contains a question to be searched in the form of an oral calculation question, determine the question to be searched in the form of oral calculation question as the oral calculation question to be corrected. For each oral calculation question to be corrected, a preset oral calculation engine is used to calculate the oral calculation question to be corrected, and the calculation result of the oral calculation question to be corrected is output as the answer to the oral calculation question to be corrected, thereby completing correction of oral calculation questions to be corrected on the test paper to be searched.

Optionally, the oral calculation question correcting module 25 is further configured to check whether the calculation result of the oral calculation engine is consistent with the reference answer corresponding to the oral calculation question to be corrected on the target test paper, and if they are consistent, the calculation result of the oral calculation engine is output as the answer to the oral calculation question to be corrected.

Optionally, the oral calculation question correcting module 25 is further configured to, when the calculation result of the oral calculation engine is inconsistent with the reference answer to the oral calculation question to be corrected on the target test paper, output a prompt message indicating that the calculation result of the oral calculation engine is inconsistent with the reference answer to the oral calculation question to be corrected, so as to alert the examiner of the test paper to pay attention to the oral calculation question to be corrected.

Optionally, the preset oral calculation engine may include a pre-trained first identification model, and the first identification model is a neural network-based model.

The oral calculation question correcting module 25 is specifically configured to identify numbers, alphabets, text, characters, and calculation types in the oral calculation question to be corrected through the pre-trained first identification model, and the calculation types include four mixed arithmetic calculation, estimation, division with remainder, fraction calculation, conversion of units, vertical calculation, and recursion equation calculation. Calculations are performed based on the identified numbers, alphabets, text, characters, and calculation types to obtain the calculation result of the oral calculation question to be corrected.

Optionally, the question searching module 22 may include:

a feature vector obtaining unit, which may be configured to input the token content in the stem of each question to be searched into a pre-trained stem vectorization model to obtain the feature vector of the stem of each question to be searched as the feature vector of each question to be searched, wherein the stem vectorization model is a neural network-based model;

a question searching unit, configured to perform a search for each question to be searched in the question bank to find a feature vector matching the feature vector of the question to be searched, and determine the corresponding question with the matching feature vector in the question bank to be the question most similar to the question to be searched.

Optionally, the stem vectorization model is obtained through training in the following steps:

marking each question sample in a question sample training set to mark the token content of the stem in each question sample;

using a neural network model to extract two-dimensional feature vectors of the token content of the stem in each question sample, thereby obtaining the stem vectorization model through training.

Optionally, the device may further include:

a preprocessing module, which may be configured to establish an index information table for feature vectors of each question on the test paper in the question bank;

the question searching unit, specifically configured to, for each question to be searched, look up the index information table for a feature vector matching the feature vector of the question to be searched; and determine the question corresponding to the matching feature vector in the index information table as the question most similar to the question to be searched.

Optionally, before establishing the index information table, the preprocessing module is further configured to group feature vectors of different lengths according to lengths.

The question searching unit is specifically configured to, for each question to be searched, look up the index information table to find a feature vector matching the feature vector of the question to be searched in a group having the same or similar length as the feature vector of the question to be searched.

Optionally, the test paper determining module 23 is specifically configured to determine the test paper with the highest frequency of occurrence greater than the first preset threshold as the target test paper that matches the test paper to be searched.

Optionally, the detection and identification module 21 is specifically configured to use a pre-trained detection model to detect the image of the test paper to be searched to detect the area of each question to be searched on the test paper to be searched, wherein the detection model is a neural network-based model.

Optionally, the detection and identification module 21 is specifically configured to use the pre-trained second identification model to identify the token content in the stem in the area of each question to be searched, wherein the second identification model is a neural network-based model.

Figure 3:
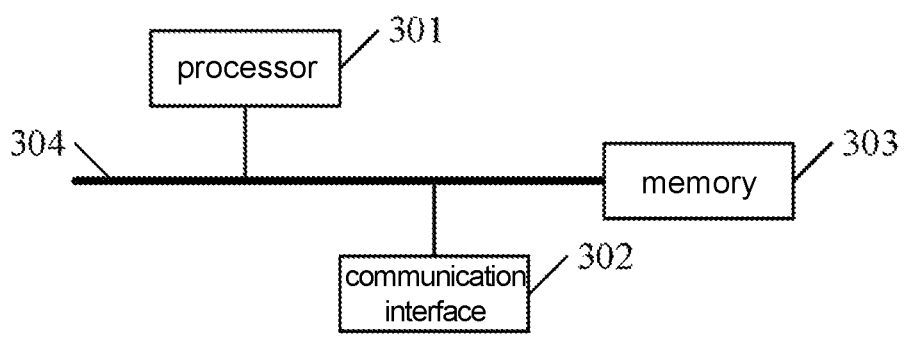
FIG. 3 is a schematic structural diagram of an electronic equipment provided by an embodiment of the present disclosure.

An embodiment of the present disclosure also provides an electronic device, as shown in FIG. 3, including a processor 301, a communication interface 302, a memory 303, and a communication bus 304, wherein the processor 301, the communication interface 302, and the memory 303 complete communication with each other through the communication bus 304.

The memory 303 is configured for storing computer programs.

The processor 301 is configured to implement the following steps when the program stored in the memory 303 is executed.

Step S11: detecting the image of the test paper to be searched, detecting the areas of each question to be searched on the test paper to be searched, determining the type of each question to be searched, and identifying the content of token in the stem in the area of each question to be searched;

Step S12: obtaining the feature vector of the question to be searched according to the token content in the stem of each question to be searched, and conducting search in the question bank according to the feature vector of the question to be searched to find the question most similar to the question to be searched;

Step S13: summarizing all the test papers with the questions most similar to the questions to be searched, and determining the test paper satisfying the preset condition to be the target test paper matching the test paper to be searched;

Step S14: in the case that the test paper to be searched includes a question to be searched in the form of oral calculation question, for each question to be searched in the form of oral calculation question, the feature vector of the question to be searched and the feature vector of each question in the target test paper are subjected to shortest editing distance matching to determine the target question that matches the question to be searched in the target test paper, if the type of question of the target question is an oral calculation question, the question to be searched is determined as the oral calculation question to be corrected;

Step S15: for each oral calculation question to be corrected, a preset oral calculation engine is used to calculate the oral calculation question to be corrected, and the calculation result of the oral calculation engine is output as the answer to the oral calculation question to be corrected, thereby completing correction of oral calculation questions to be corrected on the test paper to be searched.

For the specific implementation of each step of the method and related explanations, please refer to the embodiment of the method shown in FIG. 1 above, and no further descriptions are incorporated herein.

In addition, the other implementations through which the processor 301 executes the program stored in the memory 303 to implement the question correction method for oral calculation questions are the same as the implementations mentioned in some of the foregoing embodiments of the method, and thus no further descriptions are incorporated herein.

The above-mentioned communication bus of the electronic equipment may be a Peripheral Component Interconnect (PCI) bus or an Extended Industry Standard Architecture (EISA) bus, etc. The communication bus can be divided into address bus, data bus, control bus, etc. For ease of illustration, the figure is simply illustrated by showing a thick line, but it does not mean that there is only one bus or one type of bus.

The communication interface is used for communication between the above electronic equipment and other equipment.

The memory may include a random access memory (RAM), and may also include a non-volatile memory (NVM), such as at least one disk memory. Optionally, the memory may also be at least one storage device located far away from the foregoing processor.

The above-mentioned processor may be a general-purpose processor, including a central processing unit (CPU), a network processor (NP), and the like; it may also be a digital signal processor (DSP), an Application Specific Integrated Circuit (ASIC), a Field-Programmable Gate Array (FPGA) or other programmable logic devices, a discrete gate or a transistor logic device, a discrete hardware component.

An embodiment of the present disclosure also provides a computer-readable storage medium, the computer-readable storage medium stores a computer program, and the computer program implements the steps of the question correction method for oral calculation questions as described above when being executed by the processor.

Example 2

Figure 4:
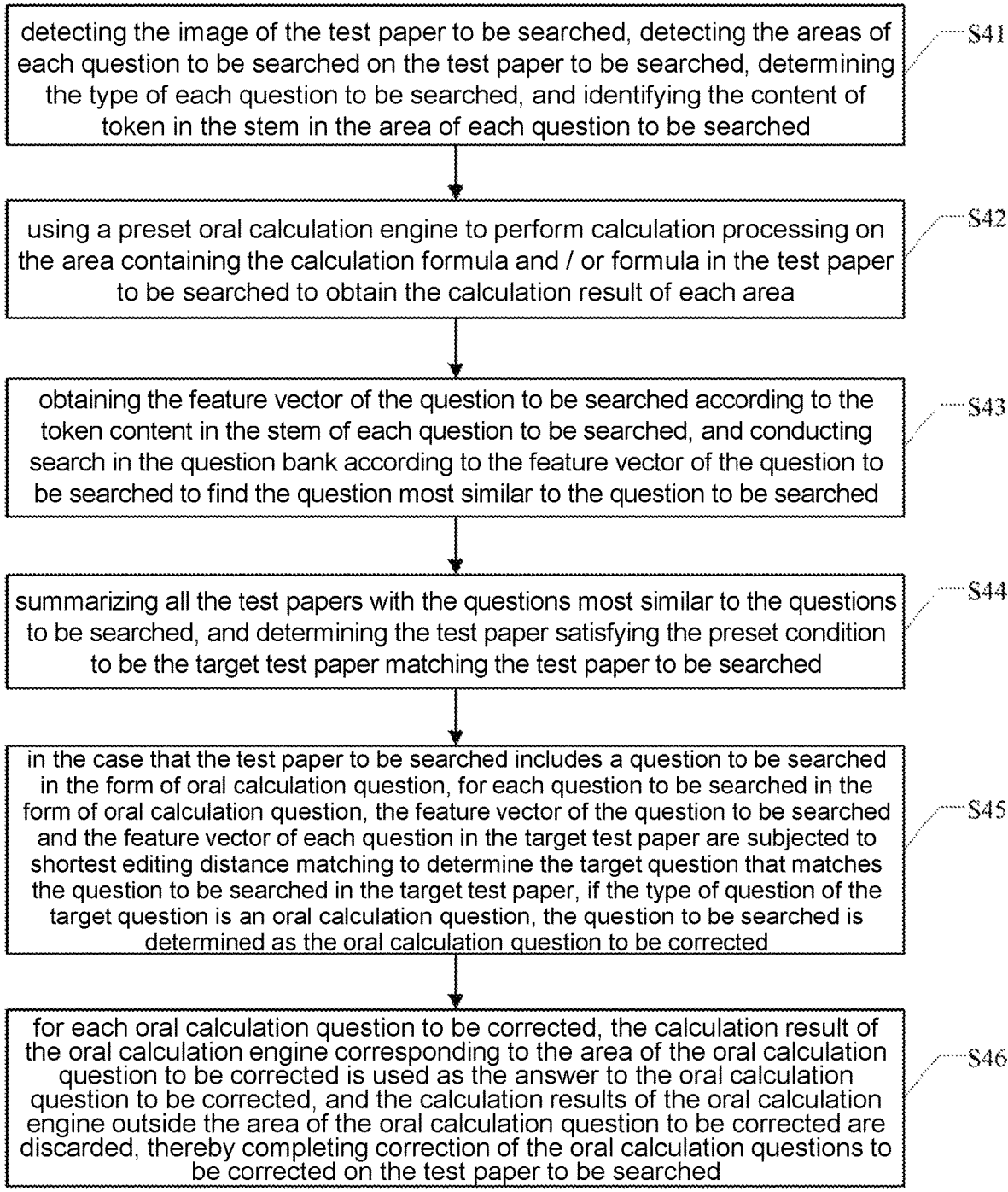
FIG. 4 is a schematic flowchart of a question correction method for oral calculation questions according to another embodiment of the present disclosure.

FIG. 4 is a schematic flowchart of a question correction method for oral calculation questions according to another embodiment of the present disclosure. Please refer to FIG. 4, a question correction method for oral calculation questions can include the following steps.

Step S41: detecting the image of the test paper to be searched, detecting the areas of each question to be searched on the test paper to be searched, determining the type of each question to be searched, and identifying the content of token in the stem in the area of each question to be searched.

The image of the test paper to be searched can be an image containing the test paper to be searched. Specifically, the image of the test paper to be searched can be detected by using a detection model to detect the area of each question to be searched on the test paper to be searched. The detection model is a neural network-based model. Specifically, the detection model may be obtained, for example, by training samples in a test paper sample training set based on a Deep Convolutional Neural Network (CNN). The trained detection model is used to extract two-dimensional feature vectors from the images of the test papers to be searched, and anchor points with different shapes are generated on each grid of the two-dimensional feature vectors. A groundtruth box is used to mark the detected area of each question to be searched, and the groundtruth box and the generated anchor point are further subjected to a regression process so that the groundtruth box is closer to the actual position of the question. After the area of question is identified, each question to be searched is cut into a single image, or not actually cut but is subjected to processing by separating each area of question to be searched as a single area image for processing and arranged in order according to the information of question position.

After identifying the area of each question to be searched, a classification identification model can be used to determine the type of each question to be searched. The classification identification model is a neural network-based model. Specifically, the classification identification model may be obtained, for example, by training samples in a test paper sample training set based on a deep convolutional neural network. The questions in each sample are marked with questions types. Question types can be divided into operation questions, oral calculation questions, fill in the blank questions, multiple choice questions, application questions, etc.

Meanwhile, the content of token in the stem in the area of the question to be searched can also be identified by using a second identification model, which is a neural network-based model. First the components of the question to be searched are marked, and the components can include a stem, an answer, and/or a picture, and then the content of token in the stem in the question is identified through the second identification model, wherein the second identification model may be established based on a hole convolution and an attention model. Specifically, the hole convolution is used to extract the features of the groundtruth box corresponding to the stem, answer and/or picture, and then the attention model is used to decode the extracted feature into characters.

Step S42: using a preset oral calculation engine to perform calculation processing on the area containing the calculation formula and/or formula in the test paper to be searched to obtain the calculation result of each area.

Specifically, the preset oral calculation engine may include a pre-trained first identification model, the first identification model is a neural network-based model. The same as the second identification model, the first identification model may be established based on a hole convolution and an attention model. Specifically, the hole convolution is used for feature extraction on the oral calculation question to be corrected, and then the attention model is used to decode the extracted feature into characters.

In step S42, the preset oral calculation engine is used to perform calculation processing on the area containing the calculation formula and/or formula in the test paper to be searched, which may include: the pre-trained first identification model is used to identify numbers, alphabets, text, characters, and calculation types in the area containing the calculation formula and/or formula in the test paper to be searched. The calculation types include four mixed arithmetic calculation, estimation, division with remainder, fraction calculation, conversion of units, vertical calculation, and recursion equation calculation. Calculations are performed based on the identified numbers, alphabets, text, characters, and calculation types to obtain the calculation result of each area. For example, assume that an area in the test paper to be searched contains "385×8−265=( )". For the specific area, the oral calculation engine can identify "3", "8", "5", "×", "8", "−", "2", "6", "5", "=", "(", " ", ")" through the first identification model. The calculation type is four mixed arithmetic calculation, and then the calculation result is obtained through automatic calculation.

Step S43: obtaining the feature vector of the question to be searched according to the token content in the stem of each question to be searched, and conducting search in the question bank according to the feature vector of the question to be searched to find the question most similar to the question to be searched.

Specifically, the step S43 may further include:

In step S431, the token content in the stem of each question to be searched is input into a pre-trained stem vectorization model to obtain the feature vector of the stem of each question to be searched as the feature vector of each question to be searched, wherein the stem vectorization model is a neural network-based model.

For example, assume that the content of the token in the stem of the question to be searched is "4. Xiaoming walks for 3 minutes and is just halfway of the whole journey. How many meters is his home away from his school? (6 points)" The token content is input into a sent2vec model, which is a pre-trained stem vectorization model to obtain the feature vector of the stem, and the feature vector can be expressed as [x0, x1, x2 . . . , xn].

Specifically, the stem vectorization model may be a neural network-based model, such as a CNN model, and the stem vectorization model may be obtained by training in the following steps: marking each question sample in a question sample training set to mark the token content of the stem in each question sample; and using a neural network model to extract two-dimensional feature vectors of the token content of the stem in each question sample, thereby obtaining the stem vectorization model through training. The specific training process belongs to the related art and is not described in detail here.

In step S432: for each question to be searched, a search is performed in the question bank to find a feature vector matching the feature vector of the question to be searched, and the corresponding question with the matching feature vector in the question bank is determined to be the question most similar to the question to be searched.

Specifically, the vector approximate search approach can be used to find the feature vector matching the feature vector of the question to be searched in the question bank, and specifically to find the feature vector closest to the feature vector of the question to be searched in the question bank. It can be understood that the similarity measurement between different vectors is typically measured by calculating the "Distance" between vectors. The commonly used distance calculation methods are: European distance, Manhattan distance, angle cosine, and so on. The calculation method adopted in the Example 2 is angle cosine.

Preferably, in order to facilitate the search of feature vectors, an index information table may also be established in advance for the feature vectors of each question on the test paper in the question bank. The index information table can store the feature vector of each question in the question bank, the specific content of the question, and the ID of the test paper with the question, etc.

Correspondingly, step S432 may further include: for each question to be searched, look up the index information table for a feature vector matching the feature vector of the question to be searched; and determine the question corresponding to the matching feature vector in the index information table as the question most similar to the question to be searched.

It can be understood that after finding the matching feature vector in the index information table, the most similar question is found in the index information table, and the specific content (including the stem, answer and/or picture of the question) of the most similar question and the ID information of the test paper having the most similar question can be obtained under the circumstances.

Preferably, before establishing the index information table, the feature vectors of different lengths can be further grouped according to lengths. In this manner, when searching for a feature vector matching the feature vector of the question to be searched in the index information table, it is possible to first position the group of feature vector having the same or similar length as the feature vector of the question to be searched in the index information table (here, the group of similar length refers to that the length difference between the length of the feature vector of the question to be searched and the length of the feature vector in the index information table is less than a specific value or a preset value), so as to find the feature vector that matches the feature vector of the question to be searched in the index information table and the group having the same or similar length as the feature vector of the question to be searched. Specifically, the feature vectors having the same length can be divided into a group when grouping, and the feature vectors having a length within a certain range can also be divided into a group, which is not limited in the present disclosure. It can be seen that the feature vectors of different lengths are grouped according to length, which makes it possible to make a search in the corresponding group according to the length of feature vector when searching for questions subsequently, thereby improving the speed of question search. It can be understood that the length of the feature vector varies because of the difference in the number of token in the stem.

Step S44: summarizing all the test papers with the questions most similar to the questions to be searched, and determining the test paper satisfying the preset condition to be the target test paper matching the test paper to be searched. Specifically, by comparing the summarized test papers with a preset condition, it is possible to obtain the information regarding whether there is any target test paper satisfying the preset condition, and when a target test paper satisfying the preset condition is found, the corresponding test paper satisfying the preset condition can be obtained.

Specifically, determining a test paper that satisfies a preset condition as a target test paper matching the test paper to be searched may specifically be that: determining a test paper with a maximum occurrence frequency greater than a first preset threshold as a target test paper matching the test paper to be searched. In practice, because each question in the question bank has the corresponding test paper ID information and position information in the current test paper, it can be determined that the most similar question belongs to which test paper according to the ID of the test paper with the most similar question, thereby determining the ID of the test paper with the maximum occurrence frequency greater than the first preset threshold, and thus determining the ID of the test paper as the matching target test paper. Specifically, the frequency of occurrence of a test paper can be calculated in the following method: the ratio of the number of most similar questions for the question to be searched in the test paper to the total number of the questions to be searched in the test paper to be searched, or the ratio of the number of the matching questions in the test paper and the test paper to be searched to the total number of the question to be searched in the test paper to be searched. It can be understood that if the occurrence frequency of the most frequently occurring test paper is less than the first preset threshold, it indicates that there are too few matching questions between the most frequently occurring test paper and the test paper to be searched. Under the circumstances, it can be regarded that there is no target test paper matching the test paper to be searched in the question bank.

Further, in the case that there is no target test paper that satisfies a preset condition in step S44, when the test paper to be searched includes a question to be searched in the form of oral calculation question, the question to be searched in the form of oral calculation question can be determined as the oral calculation question to be corrected. For each oral calculation question to be corrected, a preset oral calculation engine is used to calculate the oral calculation question to be corrected, and the calculation result of the oral calculation question to be corrected is output as the answer to the oral calculation question to be corrected, thereby completing correction of oral calculation questions to be corrected on the test paper to be searched.

Step S45: in the case that the test paper to be searched includes a question to be searched in the form of oral calculation question, for each question to be searched in the form of oral calculation question, the feature vector of the question to be searched and the feature vector of each question in the target test paper are subjected to shortest editing distance matching to determine the target question that matches the question to be searched in the target test paper, if the type of question of the target question is an oral calculation question, the question to be searched is determined as the oral calculation question to be corrected.

Specifically, for the question to be searched in the form of oral calculation question, the shortest editing distance matching process can be referred to as a second search process. Through the second search process, it is possible to further ensure the oral calculation question in the test paper to be searched. In the second search process, for each question to be searched in the form of oral calculation question, the question having the smallest shortest editing distance less than the second preset threshold as compared to the question to be searched in the target test paper is used as the search result of the question to be searched, i.e., the target question matching the question to be searched in the target test paper. If the target question is also in the form of an oral calculation question, it can be confirmed that the question to be searched is indeed an oral calculation question, so as to determine that the question to be searched is an oral calculation question to be corrected. The algorithm for performing shortest editing distance matching on feature vectors is a conventional calculation method in the related art, and is not described in detail here.

For example, assume that an oral calculation question A is "385×8−265=0" and an oral calculation question B is "375×8−265=0". These two questions are very similar in their feature vectors obtained through stem vectorization. Therefore, if a question in the test paper to be searched is "385×8−265=0", in step S13, it is very likely to determine the oral calculation question B in the question bank as the question most similar to the question, that is, the search result for the question is not accurate. In order to improve the accuracy, a second search is performed for the question in the target test paper, and the search criterion is set to be the token with the smallest shortest editing distance. Since the shortest editing distance is not calculated in weight, it is likely to find that the target question corresponding to the question in the target test paper is the oral calculation question A. Since the question type of the oral calculation question A is marked as the oral calculation question, it can be determined that the question is indeed an oral calculation question.

Further, in step S45, the question type of the target question may be an oral calculation question, and in the case where the position of the target question in the target test paper is the same as the position of the question to be searched in the test paper to be searched, it can be determined that the question to be searched is an oral calculation question to be corrected. It can be understood that the position of the question to be searched and the position of the target question are verified, that is, the position of the question identified as a question to be searched in the form of oral calculation question in the test paper to be searched is compared with the position of the target question in the target test paper. If their positions are the same, it means that the target question is indeed the correct search result for the question to be searched, which can avoid that the question to be searched is erroneously identified as another similar question in the target test paper due to the difference in vector during identification. For example, if the area where the oral calculation question to be corrected is located in the test paper to be searched is consistent with the area where the target question is located in the target test paper, it means that they have the same position.

Step S46: For each oral calculation question to be corrected, the calculation result of the oral calculation engine corresponding to the area of the oral calculation question to be corrected is used as the answer to the oral calculation question to be corrected, and the calculation results of the oral calculation engine outside the area of the oral calculation question to be corrected are discarded, thereby completing correction of the oral calculation questions to be corrected on the test paper to be searched.

Specifically, in step S42, the oral calculation engine will feedback the calculation results of many areas. In step S46, for each oral calculation question to be corrected, it is likely to find the calculation result corresponding to the area that is sufficiently overlapped with the area of the oral calculation question to be corrected from the calculation results of many areas, and such calculation result is the answer to the oral calculation question to be corrected.

Further, in order to ensure that the correction result of the oral calculation question is accurate, step S46 may further include: checking whether the calculation result of the oral calculation engine is consistent with the reference answer corresponding to the oral calculation question to be corrected on the target test paper, and if they are consistent, the calculation result of the oral calculation engine is output and used as the answer to the oral calculation question to be corrected.

Further, when the calculation result of the oral calculation engine is inconsistent with the reference answer to the oral calculation question to be corrected on the target test paper, a prompt message indicating that the calculation result of the oral calculation engine is inconsistent with the reference answer to the oral calculation question to be corrected is output, so as to alert the examiner of the test paper to pay attention to the oral calculation question to be corrected.

For example, if the calculation result of the oral calculation engine is consistent with the reference answer corresponding to the oral calculation question to be corrected on the target test paper, the calculation result of the oral calculation engine is displayed in the area of the oral calculation question to be corrected. If they are inconsistent, a prompt message is displayed in the area of the oral calculation question to be corrected, and the prompt message can be: "Answer to be verified, please correct manually".

Compared with the related art, with respect to the test paper to be searched, the present disclosure uses the oral calculation engine to process the test paper to be searched, and in the meantime obtains the feature vector of the question to be searched according to the token content in the stem of each question to be searched, then uses the feature vector of each question to be searched to find the target test paper matching the test paper to be searched in the question bank. With respect to the question to be searched in the form of oral calculation question, a second search is performed in the target test paper based on the feature vector of the question, and the criterion of search is set to be the smallest shortest editing distance. If the matched target question is also in the form of an oral calculation question, it can be determined that the question to be searched is the oral calculation question to be corrected. The calculation result of the oral calculation engine corresponding to the area of the oral calculation question to be corrected is used as the answer to the oral calculation question to be corrected, and the calculation results of the oral calculation engine outside the area of the oral calculation question to be corrected are discarded. Based on the above, it can be seen that, for the oral calculation question to be corrected, since the feature vectors obtained based on the token content of stem are less distinguished from one another, leading to the result that the reference answers for the target test paper found in the question bank are more likely to be inconsistent with the oral calculation questions to be corrected. Accordingly, two times of search are preformed to determine the oral calculation question to be corrected, and the calculation result of the oral calculation engine corresponding to the oral calculation question to be corrected is used as the answer, thereby improving the accuracy of correcting the oral calculation questions.

Figure 5:
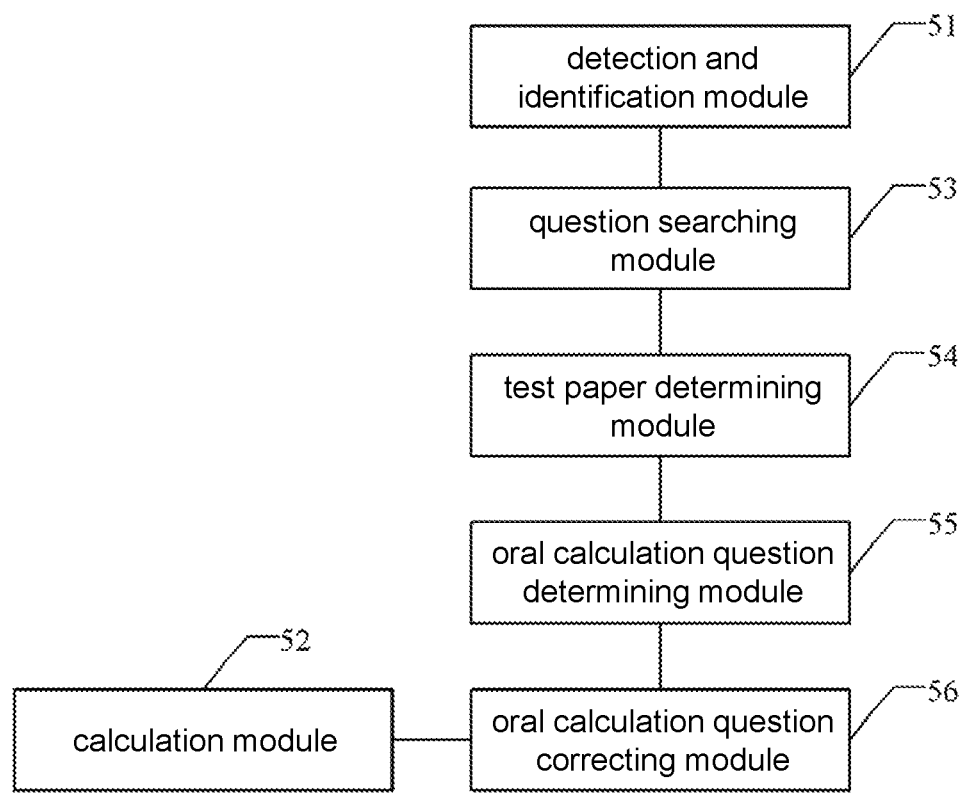
FIG. 5 is a schematic structural diagram of a question correcting device for oral calculation questions provided by another embodiment of the present disclosure.

Corresponding to the above-mentioned embodiment of the question correction method for oral calculation questions, the present disclosure provides a question correcting a device for oral calculation questions. Referring to FIG. 5, the device may include:

a detection and identification module 51, which may be configured to detect images of the test papers to be searched to detect the areas of each question to be searched on the test papers to be searched, thereby determining the type of each question to be searched, and identify the token content in the stem of the area of each question to be searched;

a calculation module 52, which may be configured to use a preset oral calculation engine to perform calculation processing on the area containing the calculation formula and/or formula in the test paper to be searched to obtain the calculation result of each area;

a question searching module 53, which may be configured to obtain the feature vector of the question to be searched according to the token content of the stem of each question to be searched, and perform a search in the question bank according to the feature vector of the question to be searched to find the question most similar to the question to be searched;

a test paper determining module 54, which may be configured to summarize all the test papers with the questions most similar to the question to be searched, and determine the test paper that satisfies the preset condition as the target test paper that matches the test paper to be searched;

an oral calculation question determining module 55, which may be configured to, in a case where the test paper to be searched includes a question to be searched in the form of oral calculation question, for each question to be searched in the form of oral calculation question, the feature vector of the question to be searched and the feature vector of each question in the target test paper are subjected to shortest editing distance matching to determine the target question that matches the question to be searched in the target test paper, if the type of question of the target question is an oral calculation question, the question to be searched is determined as the oral calculation question to be corrected;

an oral calculation question correcting module 56, which may be configured to, for each oral calculation question to be corrected, use the calculation result of the oral calculation engine corresponding to the area of the oral calculation question to be corrected as the answer to the oral calculation question to be corrected, and discard the calculation results of the oral calculation engine outside the area of the oral calculation question to be corrected, thereby completing the correction of the question to be corrected on the test paper to be searched.

Optionally, the oral calculation question determining module 55 is further configured to, under the circumstances that the question type of the target question is oral calculation question, and the position of the target question in the target test paper is the same as that of the question to be searched in the test paper to be searched, determine that the question to be searched is the oral calculation question to be corrected.

Optionally, the test paper determining module 54 is further configured to, in the case where there is no target test paper that satisfies a preset condition, and when the test paper to be searched contains a question to be searched in the form of an oral calculation question, determine the question to be searched in the form of oral calculation question to be the oral calculation question to be corrected. For each oral calculation question to be corrected, the calculation result of the oral calculation engine corresponding to the area of the oral calculation question to be corrected is used as the answer to the oral calculation question to be corrected, and the calculation results of the oral calculation engine outside the area of the oral calculation question to be corrected are discarded, thereby completing correction of the oral calculation questions to be corrected on the test paper to be searched.

Optionally, the oral calculation question correcting module 56 is further configured to check whether the calculation result of the oral calculation engine is consistent with the reference answer corresponding to the oral calculation question to be corrected on the target test paper, and if they are consistent, the calculation result of the oral calculation engine is output and used as the answer to the oral calculation question to be corrected.

Optionally, the oral calculation question correcting module 56 is further configured to, when the calculation result of the oral calculation engine is inconsistent with the reference answer to the oral calculation question to be corrected on the target test paper, output a prompt message indicating that the calculation result of the oral calculation engine is inconsistent with the reference answer to the oral calculation question to be corrected, so as to alert the examiner of the test paper to pay attention to the oral calculation question to be corrected.

Optionally, the preset oral calculation engine may include a pre-trained first identification model, and the first identification model is a neural network-based model.

The calculation module 52 may be specifically configured to use the pre-trained first identification model to identify numbers, alphabets, text, characters, and calculation types in the area containing the calculation formula and/or formula in the test paper to be searched. The calculation types include four mixed arithmetic calculation, estimation, division with remainder, fraction calculation, conversion of units, vertical calculation, and recursion equation calculation. Calculations are performed based on the identified numbers, alphabets, text, characters, and calculation types to obtain the calculation result of each area.

Optionally, the question searching module 53 may include:

a feature vector obtaining unit, which may be configured to input the token content in the stem of each question to be searched into a pre-trained stem vectorization model to obtain the feature vector of the stem of each question to be searched as the feature vector of each question to be searched, wherein the stem vectorization model is a neural network-based model;

a question searching unit, which may be configured to perform a search for each question to be searched in the question bank to find a feature vector matching the feature vector of the question to be searched, and determine the corresponding question with the matching feature vector in the question bank to be the question most similar to the question to be searched.

Optionally, the stem vectorization model is obtained through training in the following steps:

marking each question sample in a question sample training set to mark the token content of the stem in each question sample;

using a neural network model to extract two-dimensional feature vectors of the token content of the stem in each question sample, thereby obtaining the stem vectorization model through training.

Optionally, the device may further include:

a preprocessing module, which may be configured to establish an index information table for feature vectors of each question on the test paper in the question bank;

the question searching unit, which may be specifically configured to, for each question to be searched, look up the index information table for a feature vector matching the feature vector of the question to be searched; and determine the question corresponding to the matching feature vector in the index information table as the question most similar to the question to be searched.

Optionally, before establishing the index information table, the preprocessing module is further configured to group feature vectors of different lengths according to lengths.

The question searching unit is specifically configured to, for each question to be searched, look up the index information table to find a feature vector matching the feature vector of the question to be searched in a group having the same or similar length as the feature vector of the question to be searched.

Optionally, the test paper determining module 54 is specifically configured to determine the test paper with the highest frequency of occurrence greater than the first preset threshold as the target test paper that matches the test paper to be searched.

Optionally, the detection and identification module 51 is specifically configured to use a pre-trained detection model to detect the image of the test paper to be searched to detect the area of each question to be searched on the test paper to be searched, wherein the detection model is a neural network-based model.

Optionally, the detection and identification module 51 is specifically configured to use the pre-trained second identification model to identify the token content in the stem in the area of each question to be searched, wherein the second identification model is a neural network-based model.

The Example 2 of the present disclosure also provides an electronic device, please refer to FIG. 3 correspondingly, including a processor 301, a communication interface 302, a memory 303, and a communication bus 304, wherein the processor 301, the communication interface 302, and the memory 303 complete communication with each other through the communication bus 304.

The memory 303 is configured for storing computer programs.

The processor 301 is configured to implement the following steps when the program stored in the memory 303 is executed.

Step S41: detecting the image of the test paper to be searched, detecting the areas of each question to be searched on the test paper to be searched, determining the type of each question to be searched, and identifying the content of token in the stem in the area of each question to be searched;

Step S42: using a preset oral calculation engine to perform calculation processing on the area containing the calculation formula and/or formula in the test paper to be searched to obtain the calculation result of each area;

Step S43: obtaining the feature vector of the question to be searched according to the token content in the stem of each question to be searched, and conducting search in the question bank according to the feature vector of the question to be searched to find the question most similar to the question to be searched;

Step S44: summarizing all the test papers with the questions most similar to the questions to be searched, and determining the test paper satisfying the preset condition to be the target test paper matching the test paper to be searched;

Step S45: in the case that the question paper to be searched includes a question to be searched in the form of oral calculation question, for each question to be searched in the form of oral calculation question, the feature vector of the question to be searched and the feature vector of each question in the target test paper are subjected to shortest editing distance matching to determine the target question that matches the question to be searched in the target test paper, if the type of question of the target question is an oral calculation question, the question to be searched is determined as the oral calculation question to be corrected;

Step S46: for each oral calculation question to be corrected, the calculation result of the oral calculation engine corresponding to the area of the oral calculation question to be corrected is used as the answer to the oral calculation question to be corrected, and the calculation results of the oral calculation engine outside the area of the oral calculation question to be corrected are discarded, thereby completing the correction of the oral calculation question to be corrected on the test paper to be searched.

For the specific implementation of each step of the method and related explanations, please refer to the embodiment of the method shown in FIG. 4 above, and no further descriptions are incorporated herein.

In addition, the other implementations through which the processor 301 executes the program stored in the memory 303 to implement the question correction method for oral calculation questions are the same as the implementations mentioned in some of the foregoing embodiments of the method, and thus no further descriptions are incorporated herein.

The above-mentioned communication bus of the electronic equipment may be a Peripheral Component Interconnect (PCI) bus or an Extended Industry Standard Architecture (EISA) bus, etc. The communication bus can be divided into address bus, data bus, control bus, etc. For ease of illustration, the figure is simply illustrated by showing a thick line, but it does not mean that there is only one bus or one type of bus.

The communication interface is used for communication between the above electronic equipment and other equipment.

The memory may include a random access memory (RAM), and may also include a non-volatile memory (NVM), such as at least one disk memory. Optionally, the memory may also be at least one storage device located far away from the foregoing processor.

The above-mentioned processor may be a general-purpose processor, including a central processing unit (CPU), a network processor (NP), and the like; it may also be a digital signal processor (DSP), an Application Specific Integrated Circuit (ASIC), a Field-Programmable Gate Array (FPGA) or other programmable logic devices, a discrete gate or a transistor logic device, a discrete hardware component.

Example 2 of the present disclosure also provides a computer-readable storage medium, the computer-readable storage medium stores a computer program, and the computer program implements the steps of the question correction method for oral calculation questions as described above when being executed by the processor.

It should be noted that the embodiments in this specification are described in a related manner, and the same and similar parts of the various embodiments can serve as cross-reference for one another. Descriptions of each embodiment focuses on the differences from other embodiments. In particular, for the embodiments regarding the device, the electronic equipment, and the computer-readable storage medium, since they are basically similar to the embodiment concerning the method, their descriptions are relatively simple, and please refer to part of the embodiment regarding the method for related descriptions.

The above description is only a description of the preferred embodiments of the present disclosure, and does not intend to limit the scope of the present disclosure. Any changes and modifications made by those skilled in the art based on the above disclosure shall fall into the scope sought to be protected by the claims.

What is claimed is:

1. A question correction method for oral calculation questions using an electronic equipment, wherein the electronic equipment is configured to perform an image recognition to implement the question correction method, and comprises a processor and a memory, the memory is configured to store a plurality of trained neural network-based modules, the method comprises:

executing the trained neural network-based modules to implement following steps, wherein the trained neural network-based modules comprises a detection and identification module, a question searching module, a test paper determining module, an oral calculation question determining module and an oral calculation question correcting module, the steps comprises:

step S11: by the detection and identification module, detecting an image of a test paper to be searched, detecting an area of each question to be searched on the image, determining a type of said each question to be searched, and identifying the content of token in a stem in the area of said each question to be searched;

step S12: by the question searching module, obtaining a feature vector of the question to be searched on the image according to the content of token in the stem of said each question to be searched, and conducting search in a question bank according to the feature vector of the question to be searched to find a question most similar to the question to be searched;

step S13: by the test paper determining module, summarizing all the test papers with the question most similar to the question to be searched, and comparing the summarized test papers with a preset condition, if a target test paper satisfying the preset condition is found, the test paper satisfying the preset condition is determined to be a target test paper matching the test paper to be searched;

step S14: by the oral calculation question determining module, in the case that the test paper to be searched comprises a question to be searched in the form of oral calculation question, for said each question to be searched in the form of oral calculation question, the feature vector of the question to be searched and a feature vector of said each question in the target test paper are subjected to shortest editing distance matching to determine the target question that matches the question to be searched in the target test paper, if the type of question of the target question is an oral calculation question, the question to be searched is determined as an oral calculation question to be corrected; and step S15: by the oral calculation question correcting module, for said each oral calculation question to be corrected, a preset oral calculation engine is used to calculate the oral calculation question to be corrected, and a calculation result of the oral calculation engine is output as an answer to the oral calculation question to be corrected, thereby completing correction of oral calculation questions to be corrected on the test paper.

2. The question correction method for oral calculation questions according to claim 1, wherein in step S14, the question type of the target question is oral calculation question, and in the circumstances that a position of the target question in the target test paper is the same as that of the question to be searched in the test paper to be searched, it is determined that the question to be searched is the oral calculation question to be corrected.

3. The question correction method for oral calculation questions according to claim 1, wherein in step S13, if there is no target test paper that satisfies the preset condition, and when the test paper to be searched contains a question to be searched in the form of oral calculation question, the question to be searched in the form of oral calculation question is determined as the oral calculation question to be corrected, and step S15 is performed.

4. The question correction method for oral calculation questions according to claim 1, wherein step S15 further comprises: checking whether a calculation result of the oral calculation engine is consistent with a reference answer corresponding to the oral calculation question to be corrected on the target test paper, and if they are consistent, the calculation result of the oral calculation engine is used as an answer to the oral calculation question to be corrected.

5. The question correction method for oral calculation questions according to claim 4, wherein when the calculation result of the oral calculation engine is inconsistent with the reference answer to the oral calculation question to be corrected on the target test paper, a prompt message indicating that the reference answer to the oral calculation question to be corrected is inconsistent is output.

6. The question correction method for oral calculation questions according to claim 1, wherein the preset oral calculation engine comprises a pre-trained first identification model, and the first identification model is a neural network-based model;

in step S15, the preset oral calculation engine is used to calculate the oral calculation question to be corrected, which comprises:

using the pre-trained first identification model to identify numbers, alphabets, text, characters, and calculation types in the oral calculation question to be corrected, the calculation types include one of four mixed arithmetic calculation, estimation, division with remainder, fraction calculation, conversion of units, vertical calculation, and free calculation; and performing calculation according to the identified numbers, alphabets, text, characters, and calculation types to obtain a calculation result of the oral calculation question to be corrected.

7. The question correction method for oral calculation questions according to claim 1, wherein the step S12 comprises:

step S121, the content of token in the stem of said each question to be searched is input into a pre-trained stem vectorization model to obtain a feature vector of the stem of said each question to be searched as the feature vector of said each question to be searched, wherein the stem vectorization model is a neural network-based model; and step S122: for said each question to be searched, a search is performed in the question bank to find a feature vector matching the feature vector of the question to be searched, and a corresponding question with a matching feature vector in the question bank is determined to be a question most similar to the question to be searched.

8. The question correction method for oral calculation questions according to claim 7, wherein the stem vectorization model is obtained through training in the following steps:
   marking each question sample in a question sample training set to mark the content of token in the stem in said each question sample; and
   using a neural network model to extract two-dimensional feature vectors of the content of token in the stem in said each question sample, thereby obtaining the stem vectorization model through training.

9. The question correction method for oral calculation questions according to claim 7, wherein before performing step S12, the question correction method for oral calculation question further comprises: establishing an index information table for feature vectors of said each question on the test paper in the question bank;
   wherein step S122 comprises:
   for said each question to be searched, look up the index information table for a feature vector matching the feature vector of the question to be searched; and
   determine a question corresponding to the matching feature vector in the index information table as a question most similar to the question to be searched.

10. The question correction method for oral calculation questions according to claim 9, wherein before establishing the index information table, the question correction method for oral calculation questions further comprises: grouping feature vectors of different lengths according to lengths;
    for said each question to be searched, look up the index information table for a feature vector matching the feature vector of the question to be searched, which comprises:
    for said each question to be searched, in the index information table, find a feature vector matching the feature vector of the question to be searched in a group having the same or similar length as the feature vector of the question to be searched.

11. The question correction method for oral calculation questions according to claim 1, wherein in step S13, determining a test paper that satisfies a preset condition as a target test paper that matches the test paper to be searched comprises:
    determining a test paper with the highest frequency of occurrence greater than a first preset threshold as a target test paper that matches the test paper to be searched.

12. The question correction method for oral calculation questions according to claim 1, wherein in step S11, the image of the test paper to be searched is detected to detect the area of each question to be searched on the test paper to be searched, which comprises:
    detecting the image of the test paper to be searched by using a pre-trained detection model to detect the area of said each question to be searched on the test paper to be searched, wherein the detection model is a neural network-based model.

13. The question correction method for oral calculation questions according to claim 1, wherein in step S11, identifying the content of token in the stem in the area of said each question to be searched comprises:
    using a pre-trained second identification model to identify the content of token in the stem in the area of said each question to be searched, wherein the second identification model is a neural network-based model.

14. The question correction method for oral calculation questions according to claim 1, wherein after step S11 is performed, and before step S12 is performed, the question correction method for oral calculation questions further comprises:
    using the preset oral calculation engine to perform calculation processing on an area containing a calculation formula and/or a formula in the test paper to be searched to obtain a calculation result of each area;
    wherein, in step S15, for said each oral calculation question to be corrected, a calculation result of the oral calculation engine corresponding to an area of the oral calculation question to be corrected is used as an answer to the oral calculation question to be corrected, thereby completing correction of the question to be corrected on the test paper to be corrected.

15. A question correcting device for oral calculation questions by using an image recognition, the question correcting device comprises:
    a memory, configured to store a plurality of trained neural network-based modules, wherein the trained neural network-based modules comprises a detection and identification module, a question searching module, a test paper determining module, an oral calculation question determining module and an oral calculation question correcting module; and
    a processor, configured to execute the trained neural network-based modules, wherein
    the detection and identification module is configured to detect an image of a test paper to be searched to detect an area of each question to be searched on the image, thereby determining the type of said each question to be searched, and identify the content of token in a stem of the area of said each question to be searched;
    the question searching module is configured to obtain a feature vector of the question to be searched on the image according to the content of token in the stem of said each question to be searched, and perform a search in a question bank according to the feature vector of the question to be searched to find a question most similar to the question to be searched;
    the test paper determining module is configured to summarize all the test papers with the questions most similar to the question to be searched, and compare the summarized test papers with a preset condition; if a target test paper that satisfies the preset condition is found, the test paper that satisfies the preset condition is determined as a target test paper that matches the test paper to be searched;
    the oral calculation question determining module is configured to, in a case where the test paper to be searched comprises a question to be searched in the form of oral calculation question, for said each question to be searched in the form of oral calculation question, the feature vector of the question to be searched and a feature vector of each question in the target test paper are subjected to shortest editing distance matching to determine a target question that matches the question to be searched in the target test paper, if the type of question of the target question is an oral calculation question, the question to be searched is determined as the oral calculation question to be corrected; and
    the oral calculation question correcting module is configured to calculate the oral calculation question to be corrected by using a preset oral calculation engine with respect to said each oral calculation question to be corrected, and output a calculation result of the oral calculation engine as an answer to the oral calculation question to be corrected, thereby completing correction of the oral calculation question to be corrected on the test paper to be searched.

16. The question correcting device according to claim 15, wherein the oral calculation question determining module is further configured to, in the circumstances that the question type of the target question is an oral calculation question, and a position of the target question in the target test paper is the same as that of the question to be searched in the test paper to be searched, determine that the question to be searched is the oral calculation question to be corrected.

17. The question correcting device according to claim 15, wherein the test paper determining module is further configured to, if there is no target test paper that satisfies the preset condition, and when the test paper to be searched contains a question to be searched in the form of oral calculation question, determine the question to be searched in the form of oral calculation question as the oral calculation question to be corrected.

18. The question correcting device according to claim 15, wherein the oral calculation question correcting module is further configured to check whether a calculation result of the oral calculation engine is consistent with a reference answer corresponding to the oral calculation question to be corrected on the target test paper, and if they are consistent, the calculation result of the oral calculation engine is output as an answer to the oral calculation question to be corrected;
wherein the oral calculation question correcting module is further configured to, when the calculation result of the oral calculation engine is inconsistent with the reference answer to the oral calculation question to be corrected on the target test paper, output a prompt message indicating that the reference answer to the oral calculation question to be corrected is inconsistent.

19. The question correcting device according to claim 15, wherein the preset oral calculation engine comprises a pre-trained first identification model, and the first identification model is a neural network-based model;
wherein the question correcting module is configured to identify numbers, alphabets, text, characters, and calculation types in the oral calculation question to be corrected through the pre-trained first identification model, and the calculation types comprise one of four mixed arithmetic calculation, estimation, division with remainder, fraction calculation, conversion of units, vertical calculation, and free calculation, and calculations are performed based on the identified numbers, alphabets, text, characters, and calculation types to obtain a calculation result of the oral calculation question to be corrected.

20. The question correcting device for oral calculation questions according to claim 15, wherein the trained neural network-based modules further comprises:
a calculation module, configured to use the preset oral calculation engine to perform calculation processing on an area containing a calculation formula and/or a formula in the test paper to be searched to obtain a calculation result of each area;
wherein the oral calculation question correcting module is configured to, for said each oral calculation question to be corrected, use a calculation result of the oral calculation engine corresponding to an area of the oral calculation question to be corrected as an answer to the oral calculation question to be corrected, thereby completing correction of the oral calculation question to be corrected on the test paper to be searched.

21. An electronic equipment using an image recognition, comprising a processor, a communication interface, a memory, and a communication bus, wherein the processor, the communication interface, and the memory complete communication with each other through the communication bus;
wherein the memory is configured for storing a computer program comprising a plurality of trained neural network-based modules, and the trained neural network-based modules comprises a detection and identification module, a question searching module, a test paper determining module, an oral calculation question determining module and an oral calculation question correcting module; and
the processor is configured to implement steps of:
step S11: by the detection and identification module, detecting an image of a test paper to be searched, detecting an area of each question to be searched on the image, determining a type of said each question to be searched, and identifying the content of token in a stem in the area of said each question to be searched;
step S12: by the question searching module, obtaining a feature vector of the question to be searched on the image according to the content of token in the stem of said each question to be searched, and conducting search in a question bank according to the feature vector of the question to be searched to find a question most similar to the question to be searched;
step S13: by the test paper determining module, summarizing all the test papers with the question most similar to the question to be searched, and comparing the summarized test papers with a preset condition, if a target test paper satisfying the preset condition is found, the test paper satisfying the preset condition is determined to be a target test paper matching the test paper to be searched;
step S14: by the oral calculation question determining module, in the case that the test paper to be searched comprises a question to be searched in the form of oral calculation question, for said each question to be searched in the form of oral calculation question, the feature vector of the question to be searched and a feature vector of said each question in the target test paper are subjected to shortest editing distance matching to determine the target question that matches the question to be searched in the target test paper, if the type of question of the target question is an oral calculation question, the question to be searched is determined as an oral calculation question to be corrected; and
step S15: by the oral calculation question correcting module, for said each oral calculation question to be corrected, a preset oral calculation engine is used to calculate the oral calculation question to be corrected, and a calculation result of the oral calculation engine is output as an answer to the oral calculation question to be corrected, thereby completing correction of oral calculation questions to be corrected on the test paper.

22. A non-transitory computer-readable storage medium, wherein a computer program is stored in the computer-readable storage medium for causing a computer to execute the question correction method for oral calculation questions according to claim 1.

* * * * *